US011392217B2

(12) United States Patent
Strom

(10) Patent No.: US 11,392,217 B2
(45) Date of Patent: Jul. 19, 2022

(54) METHOD AND APPARATUS FOR REMOTELY PROCESSING SPEECH-TO-TEXT FOR ENTRY ONTO A DESTINATION COMPUTING SYSTEM

(71) Applicant: Mobius Connective Technologies, Ltd., San Antonio, TX (US)

(72) Inventor: Adam Christopher Strom, San Antonio, TX (US)

(73) Assignee: Mobius Connective Technologies, Ltd., San Antonio, TX (US)

( * ) Notice: Subject to any disclaimer, the term of this patent is extended or adjusted under 35 U.S.C. 154(b) by 0 days.

(21) Appl. No.: 17/366,644

(22) Filed: Jul. 2, 2021

(65) Prior Publication Data

US 2022/0019294 A1    Jan. 20, 2022

Related U.S. Application Data

(60) Provisional application No. 63/052,723, filed on Jul. 16, 2020.

(51) Int. Cl.
*G06F 3/02* (2006.01)
*G10L 15/26* (2006.01)
*G06F 40/205* (2020.01)
*G06F 3/023* (2006.01)

(52) U.S. Cl.
CPC .......... *G06F 3/0227* (2013.01); *G06F 3/0219* (2013.01); *G06F 3/0233* (2013.01); *G06F 40/205* (2020.01); *G10L 15/26* (2013.01)

(58) Field of Classification Search
CPC ...... G06F 3/0227; G06F 3/0233; G06F 3/021; G06F 40/205; G10L 15/26
See application file for complete search history.

(56) References Cited

U.S. PATENT DOCUMENTS

| | | | |
|---|---|---|---|
| 8,688,459 B2 | 4/2014 | Nenov et al. | |
| 9,070,282 B2 | 6/2015 | Clough | |
| 10,401,975 B2 | 9/2019 | Rahme et al. | |
| 10,585,813 B2 | 3/2020 | Hulbert et al. | |
| 2002/0082843 A1* | 6/2002 | Schramm ................ G10L 15/26 | |
| | | | 704/E15.045 |

(Continued)

FOREIGN PATENT DOCUMENTS

| | | |
|---|---|---|
| CN | 1248020 A | 3/2000 |
| JP | 2000339305 A | 12/2000 |

(Continued)

*Primary Examiner* — Hang Lin
(74) *Attorney, Agent, or Firm* — Christopher L. Makay

(57) ABSTRACT

A device and method for using a remote computing system, such as a smartphone or tablet, to convert speech to text through software residing on the system, transmitting the processed text wirelessly and privately to a peripheral, and having the peripheral interface with a destination computing system and appear as a generic human interface device, such as a keyboard, in order to transmit keyboard character codes through the interface to be entered into text boxes or fields on the destination computing system. By appearing to be a keyboard, the peripheral would not be locked out of the destination computing systems, even if the destination computing system is secured against software and hardware installations, restrictions by which other peripheral devices would be limited.

30 Claims, 7 Drawing Sheets

(56) References Cited

U.S. PATENT DOCUMENTS

| | | |
|---|---|---|
| 2005/0102146 A1 | 5/2005 | Lucas et al. |
| 2013/0300666 A1 | 11/2013 | Archer et al. |
| 2014/0163996 A1 | 6/2014 | Sureka et al. |
| 2014/0365214 A1* | 12/2014 | Bayley .................. G06F 3/1454 |
| | | 704/235 |
| 2016/0062647 A1 | 3/2016 | Gonzalez |
| 2016/0162638 A1 | 6/2016 | Albro et al. |
| 2018/0315428 A1 | 11/2018 | Johnson et al. |
| 2019/0038236 A1 | 2/2019 | Hays et al. |
| 2019/0361538 A1 | 11/2019 | Rahme et al. |

FOREIGN PATENT DOCUMENTS

| | | |
|---|---|---|
| WO | 2002065265 A2 | 8/2002 |
| WO | 2012061566 A3 | 5/2012 |
| WO | 2019173347 A1 | 9/2019 |

* cited by examiner

54 Universal Serial Bus HID Usage Tables

| Usage ID (Dec) | Usage ID (Hex) | Usage Name | Ref: Typical AT-101 Position | PC-AT | Mac | UNIX | Boot |
|---|---|---|---|---|---|---|---|
| 21 | 15 | Keyboard r and R | 20 | √ | √ | √ | 1/101/104 |
| 22 | 16 | Keyboard s and S4 | 32 | √ | √ | √ | 1/101/104 |
| 23 | 17 | Keyboard t and T | 21 | √ | √ | √ | 1/101/104 |
| 24 | 18 | Keyboard u and U | 23 | √ | √ | √ | 1/101/104 |
| 25 | 19 | Keyboard v and V | 49 | √ | √ | √ | 1/101/104 |
| 26 | 1A | Keyboard w and W4 | 18 | √ | √ | √ | 1/101/104 |
| 27 | 1B | Keyboard x and X4 | 47 | √ | √ | √ | 1/101/104 |
| 28 | 1C | Keyboard y and Y4 | 22 | √ | √ | √ | 1/101/104 |
| 29 | 1D | Keyboard z and Z4 | 46 | √ | √ | √ | 1/101/104 |
| 30 | 1E | Keyboard 1 and !4 | 2 | √ | √ | √ | 1/101/104 |
| 31 | 1F | Keyboard 2 and @4 | 3 | √ | √ | √ | 1/101/104 |
| 32 | 20 | Keyboard 3 and #4 | 4 | √ | √ | √ | 1/101/104 |
| 33 | 21 | Keyboard 4 and $4 | 5 | √ | √ | √ | 1/101/104 |
| 34 | 22 | Keyboard 5 and %4 | 6 | √ | √ | √ | 1/101/104 |
| 35 | 23 | Keyboard 6 and ^4 | 7 | √ | √ | √ | 1/101/104 |
| 36 | 24 | Keyboard 7 and &4 | 8 | √ | √ | √ | 1/101/104 |
| 37 | 25 | Keyboard 8 and *4 | 9 | √ | √ | √ | 1/101/104 |
| 38 | 26 | Keyboard 9 and (4 | 10 | √ | √ | √ | 1/101/104 |
| 39 | 27 | Keyboard 0 and )4 | 11 | √ | √ | √ | 1/101/104 |
| 40 | 28 | Keyboard Return (ENTER)5 | 43 | √ | √ | √ | 1/101/104 |
| 41 | 29 | Keyboard ESCAPE | 110 | √ | √ | √ | 1/101/104 |
| 42 | 2A | Keyboard DELETE (Backspace)13 | 15 | √ | √ | √ | 1/101/104 |
| 43 | 2B | Keyboard Tab | 16 | √ | √ | √ | 1/101/104 |
| 44 | 2C | Keyboard Spacebar | 61 | √ | √ | √ | 1/101/104 |

FIG. 7

METHOD AND APPARATUS FOR REMOTELY PROCESSING SPEECH-TO-TEXT FOR ENTRY ONTO A DESTINATION COMPUTING SYSTEM

BACKGROUND OF THE INVENTION

1. Field of the Invention

The present invention relates to using speech-to-text processing transmitted to a peripheral device to enter text into forms or pages on a computing device, and, more particularly, but not by way of limitation, to entering data such as medical information dictated into a device such as a smartphone, having the spoken word processed to text, and having a peripheral device presenting as a keyboard interface to enter text into the computing device without the need to install proprietary driver software, such as in computing devices that, for security purposes, do not allow installation of additional software.

2. Description of the Related Art

Many occupations and industries require extensive record keeping for a variety of reasons. In many cases, the data for these records are entered into devices such as personal computers by individuals who must manually input these data using keyboards, a method that is still in use in the many decades that office automation has existed. Over the years, the volume and type of data that is required to be stored has increased as technology advancements allow for greater analysis and use of the data.

In no industry is this more apparent than health care. Physicians, Nurses, EMTs, and other medical care providers are tasked with keeping voluminous records for several reasons. Most importantly, these records provide a history of patient care and are used to track illness/injury, treatment, and progress. Other reasons include supporting reimbursement for health services provided from insurance companies, workers' compensation or government assistance, providing evidence of disability for disability claims, identifying adverse reactions to drugs and treatments by patients, studying disease trends, and establishing baselines for treatments.

An Electronic Health Record (EHR) is the health record of an individual stored in and accessed with a computer. The EHR contains current and historical medical information that can be used by health care providers in a variety of settings such as a primary care physician's office, a long-term care facility, or a local public health department. Hospitals and clinics routinely use EHR systems to increase efficiency and to maintain centralized storage of records.

Physicians and other health care providers, as stated before, must record and log large quantities of information on patients within these EHR systems. This record-keeping is a time-consuming task and reduces the providers' availability for direct patient care. One way that physicians try to make this task less onerous and time-consuming is to record audio information onto handheld devices, such as smartphones. These recordings are later transcribed for entry by medical transcriptionists. Alternatively, handheld devices interface directly with EHR software employing speech-to-text processing. The handheld devices deliver spoken medical information to the EHR software, which, in turn, records and stores the medical information, often in a centralized location.

In all industries, the storage of data in centralized locations presents security concerns. This is particularly true in the health care industry where a violation of federal and state data privacy requirements imposed upon EHR system hosts can result in extremely large civil penalties. Cybercriminals attack many industries, including health care systems, breaching data storage systems and stealing personal identifiable information, with the numbers increasing yearly. In addition to fines for the improper handling of private health data, these breaches can have additional consequences, particularly for breaches of medical data. Breaches of medical EHR data can result in not just fines, but the loss of critical information, jeopardizing health care operations. Not only do health care operations expend time and funds for fixing the results of a breach, but the operations are often forced to close for a period of time to all but the most critical of new patients, placing lives at risk.

Accordingly, computer systems storing highly confidential information must take such threats even more seriously and implement even higher levels of security than other industries. Common methods of preventing data leaks or cyberattacks involve such techniques as limiting access to certain websites, virus-checking incoming emails, and locking interfaces on computers such as peripheral ports so that potential carriers of ransomware or viruses, including USB flash memory drives, cannot be connected to computers. These ports can be configured so that only certain peripherals (such as a keyboard or mouse) are able to interface with the computer.

In light of computers being locked-down for security purposes, users are typically unable to install their own software. Any attempts to do so by downloading software from a website, installing from a disk, or installing through a USB memory drive, would be thwarted by security software or hardware lockouts. With these security measures in place in health care settings, physicians and other health care workers typically cannot employ speech-to-text processing and are limited to data entry by using only generic Human Interface Devices (HID) interfaces, such as a USB keyboard or USB mouse, which security software and hardware limiting protocols typically allow to be connected.

With limitations placed on users of computer systems in regards to installing personal software on devices due to strict security protocols, the ability to enter text by speech recognition through a device that processes the speech-to-text-externally to the computer system but interfaces and appears as a generic HID device would be highly advantageous.

SUMMARY OF THE INVENTION

In accordance with the present invention, in a first embodiment, an audio input device, which includes a microphone, memory, processors, transmitters, and antennas capable of sending and receiving wireless signals, receives a voice input comprised of speech and system commands through a microphone. The audio input device processes the voice input information into a text signal containing the text in electronic machine usable format, embeds the electronic machine usable format text data from the text signal into a wireless signal, and transmits the wireless signal to a peripheral. The peripheral, which includes non-transitory storage memory, processors, transmitters, and antennas, receives the wireless signal, extracts and processes the wireless signal into an intermediate signal containing the text data in electronic machine usable format, converts the intermediate signal into keyboard character codes, and transfers the keyboard character codes to the destination computing system through a wired interface by a wired signal.

In another embodiment, the audio input device receives a voice input comprised of speech and system commands through a microphone. The audio input device processes the voice input information into an electronic machine usable format and embeds this voice data into a wireless signal. The audio input device transmits the wireless signal to a peripheral, which includes non-transitory storage memory and instructions, processors, transmitters and antennas. The wireless signal containing voice data is received by the peripheral which extracts said voice data from the wireless signal to convert into an intermediate signal containing the voice data in an electronic machine usable format. The peripheral performs speech-to text conversion to create text data in electronic machine usable format. The text data is further processed by parsing the text data into individual characters by performing a lookup of the keyboard character codes in tables stored in memory and determining individual or multiple keyboard character codes. The intermediate signal data containing the keyboard character codes is extracted and embedded into a wired signal for transfer to a destination computing device through a wired interface by the wired signal.

A computer-peripheral device configured to present as an HID keyboard to a destination computing system includes a transceiver, a non-transitory memory storage, one or more hardware processors, and an interface port. The transceiver is configured to receive a wireless signal embedded with text data developed from a voice input. The non-transitory memory storage includes instructions and a lookup table stored therein. The lookup table includes each keyboard character code associated with each individual character available on an HID keyboard.

The one or more hardware processors, which communicate with the non-transitory memory storage and the transceiver, are configured to execute the instructions stored in the non-transitory memory storage. In accordance therewith, the one or more hardware processors extract the text data from the wireless signal, embed the text data in an internal peripheral signal, and store the text data embedded within the internal peripheral signal in the non-transitory memory storage. The one or more hardware processors further determine a keyboard character code for each character in the text data to develop keyboard character codes corresponding with the text data, store the keyboard character codes in the non-transitory memory storage, and generate a wired signal embedded with the keyboard character codes.

The interface port, which communicates with the one or more hardware processors, interfaces with the destination computing system in order for the computer-peripheral device to communicate with the destination computing system. As such, the one or more hardware processors, following connection to the destination computing system via the interface port, transmit the keyboard character codes embedded within the wired signal to the destination computing system through the interface port.

The one or more hardware processors when developing keyboard character codes determine whether the text data correspond to characters or a defined user command. If the text data correspond to characters, the one or more hardware processors determine a keyboard character code for each character in the text data to develop keyboard character codes corresponding with the text data. Alternatively, if the text data correspond to a defined user command, the one or more hardware processors determine each keyboard character code required by the defined user command in the text data to develop keyboard character codes corresponding with the defined user command.

The one or more hardware processors when determining a keyboard character code for each character in the text data parses the text data into each individual character comprising the text data. The one or more hardware processors then compare each individual character in the text data with each keyboard character code in the lookup table until the keyboard character code associated with the individual character in the text data is determined, thereby developing keyboard character codes corresponding with the text data. The one or more hardware processors next store the keyboard character codes in the non-transitory memory storage. The one or more hardware processors finally generate the wired signal embedded with the keyboard character codes.

The one or more hardware processors when determining each keyboard character code required by the defined user command compare the defined user command in the text data with each keyboard character code in the lookup table until keyboard character codes associated with the defined user command in the text data are determined, thereby developing the keyboard character codes corresponding with the text data. The one or more hardware processors then store the keyboard character codes in the non-transitory memory storage. The one or more hardware processors finally generate the wired signal embedded with the keyboard character codes.

The one or more hardware processors include a CPU and a wireless processing unit configured to execute the instructions stored in the non-transitory memory storage. The CPU determines the keyboard character code for each text character in the text data to develop keyboard character codes corresponding with the text data and stores the keyboard character codes in the non-transitory memory storage. The CPU further generates a wired signal embedded with the keyboard character codes and transmits to the destination computing system through the interface port the keyboard character codes embedded within the wired signal. The wireless processing unit extracts the text data from the wireless signal and embeds the text data in an internal peripheral signal. The wireless processing unit further stores the text data embedded within the internal peripheral signal in the non-transitory memory storage independent of the CPU.

A speech-to-text conversion system includes an audio input device and the previously described computer-peripheral device configured to present as an HID keyboard to a destination computing system. The audio input device is configured to receive a voice input and perform speech-to-text processing on the voice input thereby producing text data representing the voice input. The audio input device further is configured to embed the text data in a wireless signal and transmit the wireless signal embedded with the text data representing the voice input to the transceiver of the computer-peripheral device.

A speech-to-text conversion system alternatively includes an audio input device and a computer-peripheral device configured to present as an HID keyboard to a destination computing system. The audio input device is configured to receive a voice input, embed the voice input in a wireless signal, and transmit the wireless signal embedded with the voice input.

The computer-peripheral device includes a transceiver, a non-transitory memory storage, one or more hardware processors, and an interface port. The transceiver is configured to receive the wireless signal embedded with the voice input from the audio input device. The non-transitory memory storage stores instructions including instructions for speech-to-text conversion and a lookup table stored. The lookup table includes each keyboard character code associated with each individual character available on an HID keyboard.

The one or more hardware processors, which communicate with the non-transitory memory storage and the transceiver, are configured to execute the instructions stored in the non-transitory memory storage. In accordance therewith, the one or more hardware processors extract the voice input from the wireless signal, convert the voice input into text data representing the voice input, embed the text data in an internal peripheral signal, and store the text data embedded within the internal peripheral signal in the non-transitory memory storage. The one or more hardware processors further determine a keyboard character code for each character in the text data to develop keyboard character codes corresponding with the text data, store the keyboard character codes in the non-transitory memory storage, and generate a wired signal embedded with the keyboard character codes.

The interface port, which communicates with the one or more hardware processors, interfaces with the destination computing system in order for the computer-peripheral device to communicate with the destination computing system. As such, the one or more hardware processors, following connection to the destination computing system via the interface port, transmit the keyboard character codes embedded within the wired signal to the destination computing system through the interface port.

The one or more hardware processors when developing keyboard character codes determine whether the text data correspond to characters or a defined user command. If the text data correspond to characters, the one or more hardware processors determine a keyboard character code for each character in the text data to develop keyboard character codes corresponding with the text data. Alternatively, if the text data correspond to a defined user command, the one or more hardware processors determine each keyboard character code required by the defined user command in the text data to develop keyboard character codes corresponding with the defined user command.

The one or more hardware processors when determining a keyboard character code for each character in the text data parses the text data into each individual character comprising the text data. The one or more hardware processors then compare each individual character in the text data with each keyboard character code in the lookup table until the keyboard character code associated with the individual character in the text data is determined, thereby developing keyboard character codes corresponding with the text data. The one or more hardware processors next store the keyboard character codes in the non-transitory memory storage. The one or more hardware processors finally generate the wired signal embedded with the keyboard character codes.

The one or more hardware processors when determining each keyboard character code required by the defined user command compare the defined user command in the text data with each keyboard character code in the lookup table until keyboard character codes associated with the defined user command in the text data are determined, thereby developing the keyboard character codes corresponding with the text data. The one or more hardware processors then store the keyboard character codes in the non-transitory memory storage. The one or more hardware processors finally generate the wired signal embedded with the keyboard character codes.

The one or more hardware processors include a CPU and a wireless processing unit configured to execute the instructions stored in the non-transitory memory storage. The CPU converts the voice input into text data representing the voice input, embeds the text data in an internal peripheral signal, and stores the text data embedded within the internal peripheral signal in the non-transitory memory storage. The CPU further determines the keyboard character code for each text character in the text data to develop keyboard character codes corresponding with the text data and stores the keyboard character codes in the non-transitory memory storage. The CPU still further generates a wired signal embedded with the keyboard character codes and transmits to the destination computing system through the interface port the keyboard character codes embedded within the wired signal. The wireless processing unit extracts the voice input from the wireless signal and stores the voice input in the non-transitory memory storage independent of the CPU.

The one or more hardware processors alternatively include a CPU and a wireless processing unit configured to execute the instructions stored in the non-transitory memory storage. The CPU determines the keyboard character code for each text character in the text data to develop keyboard character codes corresponding with the text data and stores the keyboard character codes in the non-transitory memory storage. The CPU further generates a wired signal embedded with the keyboard character codes and transmits to the destination computing system through the interface port the keyboard character codes embedded within the wired signal. The wireless processing unit extracts the voice input from the wireless signal and stores the voice input in the non-transitory memory storage independent of the CPU. The wireless processing unit further converts the voice input into text data representing the voice input, embeds the text data in an internal peripheral signal, and stores the text data embedded within the internal peripheral signal in the non-transitory memory storage independent of the CPU.

A method of presenting a computer-peripheral device to a destination computing system as an HID keyboard includes coupling an interface port of the computer-peripheral device with a wired interface port of the destination computing system. The method then includes receiving a wireless signal embedded with text data developed from a voice input, extracting the text data from the wireless signal, embedding the text data in an internal peripheral signal, and storing the text data embedded within the internal peripheral signal in a non-transitory memory storage. The method next includes determining a keyboard character code for each character in the text data to develop keyboard character codes corresponding with the text data and storing the keyboard character codes in the non-transitory memory storage. The method finally includes generating a wired signal embedded with the keyboard character codes and transmitting the keyboard character codes embedded within the wired signal from the computer-peripheral device to the destination computing system via the interface port of the computer-peripheral device and the wired interface port of the destination computing system.

The method also includes determining whether the text data correspond to characters or a defined user command. The method when the text data correspond to characters includes determining a keyboard character code for each character in the text data to develop keyboard character codes corresponding with the text data. The method when the text data correspond to a defined user command includes determining each keyboard character code required by the defined user command in the text data to develop keyboard character codes corresponding with the defined user command.

The method in developing keyboard character codes includes storing in the non-transitory memory storage a lookup table, comprising each keyboard character code associated with each individual character available on an HID keyboard. The method when the text data correspond to characters includes parsing the text data into each individual character comprising the text data. The method further includes comparing each individual character in the text data with each keyboard character code in the lookup table until the keyboard character code associated with the individual character in the text data is determined, thereby developing keyboard character codes corresponding with the text data. The method still further includes storing the keyboard character codes in the non-transitory memory storage and generating the wired signal embedded with the keyboard character codes. The method when the text data correspond to a defined user command includes comparing the defined user command in the text data with each keyboard character code in the lookup table until keyboard character codes associated with the defined user command in the text data are determined, thereby developing the keyboard character codes corresponding with the text data. The method further includes storing the keyboard character codes in the non-transitory memory storage and generating the wired signal embedded with the keyboard character codes.

An alternative method of presenting a computer-peripheral device to a destination computing system as an HID keyboard includes coupling an interface port of the computer-peripheral device with a wired interface port of the destination computing system. The method then includes receiving a wireless signal embedded with a voice input, extracting the voice input from the wireless signal, converting the voice input into text data representing the voice input, embedding the text data in an internal peripheral signal, and storing the text data embedded within the internal peripheral signal in a non-transitory memory storage. The method further includes determining a keyboard character code for each character in the text data to develop keyboard character codes corresponding with the text data and storing the keyboard character codes in the non-transitory memory storage. The method finally includes generating a wired signal embedded with the keyboard character codes and transmitting the keyboard character codes embedded within the wired signal from the computer-peripheral device to the destination computing system via the interface port of the computer-peripheral device and the wired interface port of the destination computing system.

The method also includes determining whether the text data correspond to characters or a defined user command. The method when the text data correspond to characters includes determining a keyboard character code for each character in the text data to develop keyboard character codes corresponding with the text data. The method when the text data correspond to a defined user command includes determining each keyboard character code required by the defined user command in the text data to develop keyboard character codes corresponding with the defined user command.

The method in developing keyboard character codes includes storing in the non-transitory memory storage a lookup table, comprising each keyboard character code associated with each individual character available on an HID keyboard. The method when the text data correspond to characters includes parsing the text data into each individual character comprising the text data. The method further includes comparing each individual character in the text data with each keyboard character code in the lookup table until the keyboard character code associated with the individual character in the text data is determined, thereby developing keyboard character codes corresponding with the text data. The method still further includes storing the keyboard character codes in the non-transitory memory storage and generating the wired signal embedded with the keyboard character codes. The method when the text data correspond to a defined user command includes comparing the defined user command in the text data with each keyboard character code in the lookup table until keyboard character codes associated with the defined user command in the text data are determined, thereby developing the keyboard character codes corresponding with the text data. The method further includes storing the keyboard character codes in the non-transitory memory storage and generating the wired signal embedded with the keyboard character codes.

It is therefore an object of the present invention to provide a device and method for a user to dictate speech remotely and have it converted into text entered on to a speech-to-text computing system, where the speech to text conversion takes place on an application within the speech-to-text computing system (such as a smartphone), allowing the user to utilize software that is personalized for the user for better familiarity with the software's method of use and for increased accuracy with user voice customization.

It is a further object of the present invention to provide a device and method for a user to dictate speech remotely and have it converted into text to be entered on to a destination computing system, with the text data transmitted wirelessly and securely, such as by the wireless technology of Bluetooth™, from the speech-to-text computing system to a peripheral that pairs with the speech-to-text computing system for a secure and reliable limited-range transfer of the data.

It is yet a further object of the present invention to provide a device and method for a user to dictate speech remotely and have it converted into text entered on to a destination computing system, where the peripheral connects to the destination computing system (through an interface method such as a USB plug) and appears as a generic Human Interface Device (such as a keyboard) which only transmits text data that appear as keystrokes in the form of keyboard character codes as to not be prevented from interfacing by security software on the destination computing system.

It is still a further object of the present invention to provide a device and method for a user to dictate speech remotely and have it converted into text entered on to a destination computing system, where the peripheral performs the speech-to-text conversion.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF THE DRAWINGS

FIG. 7 is a table illustrating an example textual display of USB keyboard character code lookup data for the speech-to-text conversion system.

DETAILED DESCRIPTION OF THE PREFERRED EMBODIMENTS

Figure 1:
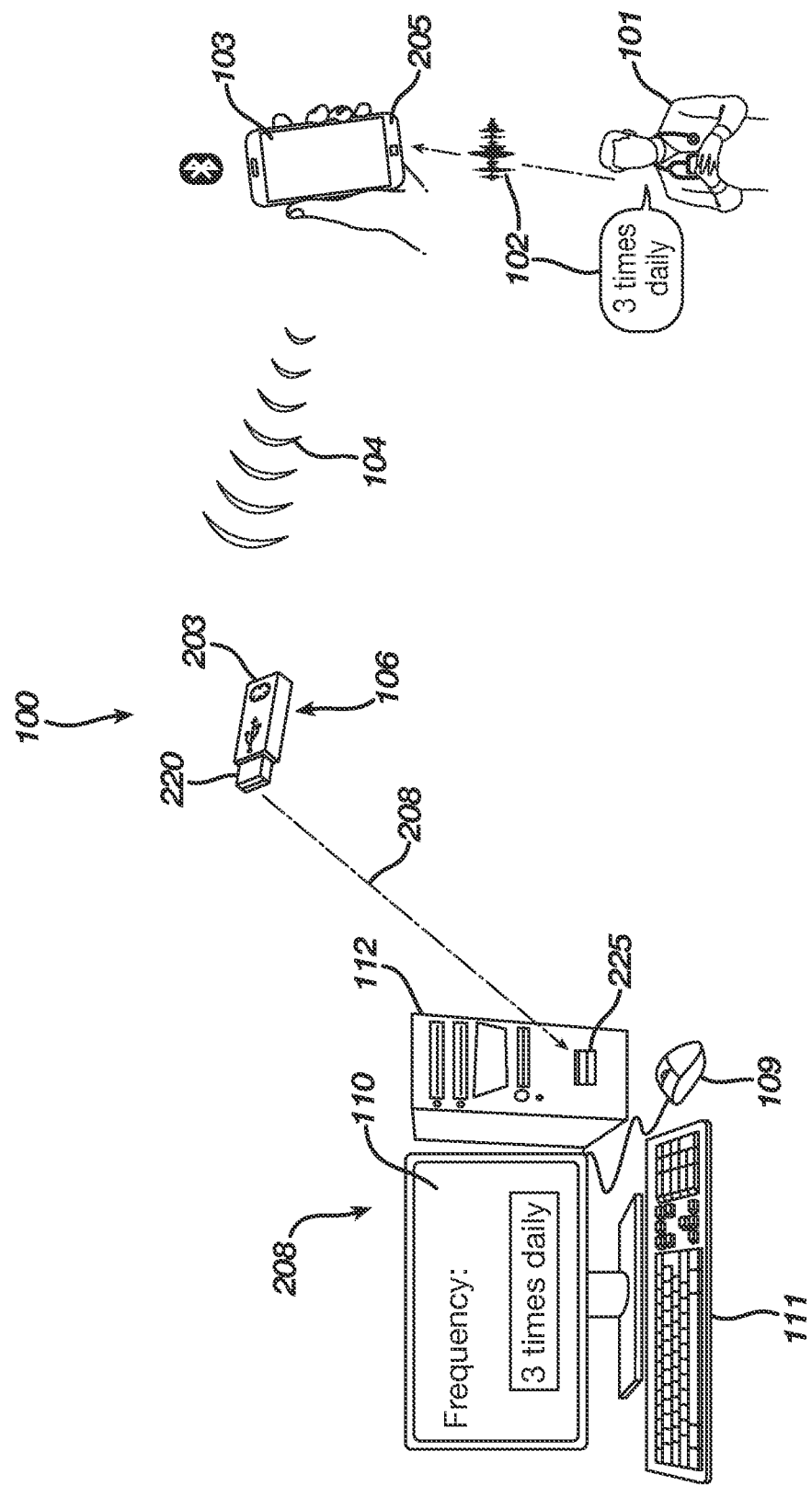
FIG. 1 is a schematic diagram illustrating a speech-to-text conversion system including a peripheral that interfaces with an audio input device and a destination computing system in order to convert speech-to-text for entry onto the destination computing system.

A detailed embodiment of the present invention is disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

Speech-to-text software (also known as voice-recognition software) is a class of software that takes audio content and transcribes it into written words in an electronic machine useable format, typically for further processing such as use in a word processor, on a display destination, or as executable commands by other software. Speech-to-text software is commonly sold as a stand-alone application; however, many devices, such as smartphones, incorporate speech-to-text software into their operating systems. While speech-to-text software programs include varied uses, many speech-to-text software programs focus on assisting with transcription and thus concentrate on recognizing a wide range of vocabulary from a single user or a limited set of users by training the software to learn the user's distinct voice patterns for greater accuracy.

Speech-to-text software programs break spoken-word audio down into short "samples" and associate those samples with simple phonemes or units of pronunciation. Algorithms are used by the speech-to-text software to sort the results and try to predict the word or phrase that was spoken and convert that word or phrase into written words or interpreted commands which can be executed by that software or sent to other software for further processing. Speech-to-text is well-known to one of ordinary skill in the art and can be seen in operation on many computing devices (such as Apple's Siri in iPhones and Mac computers, as well as Amazon's Alexa in its Echo devices).

Features of the various embodiments may be implemented in software, hardware, firmware, and combinations of these. The processes described are not limited to any particular embodiment and may take place in an operating system, application programs within a computing system, in a foreground or background process, a driver, an extension, a supporting application or combination of these. These processes may be executed on a single processor or set of processors.

Processors may be any central processing unit (CPU), microprocessor, microcontroller, device or circuit configured for executing computer program instructions. Various processors may be embodied in computing systems and may include all the usual ancillary components necessary to form a functional data processing device including without limitation a bus, non-transitory storage such as RAM or ROM containing instructions, input/output devices, graphical user interfaces (GUIs), removable data storage, and wired communication interfaces such as Universal Serial Bus (USB) and/or wireless communication interfaces such as Bluetooth or Wi-Fi. While the embodiments described herein show USB and Bluetooth™ protocols, any communication standards for wired or wireless communication interfaces could be utilized.

A "signal" is defined herein as a detectable physical quantity or impulse such as a voltage, current, or magnetic field strength by which messages or information can be transmitted, and hereafter is defined to include an object used to transmit or convey information beyond the range of human voice, or the sound or image conveyed in telegraphy, telephony, or radio. Signals will contain information or data embedded within them in whichever form they appear in this description. This information or data will be in the form of an electronic machine usable format (data in a format that can be easily processed by a computer without human intervention while ensuring no semantic meaning is lost) that may be transmitted between components by radio waves or between interconnected circuitry through buses or bridges as may be found on a computer motherboard.

It is understood that the processing of the signal that occurs is done through the interaction of various components such as microcontrollers, transceivers, circuits, and antennas. The programming and configuration of microcontrollers, transceivers, circuits, and antennas to process signals is well-known to someone skilled in the art of circuit design, and the use and programing of these components can be accomplished in different ways. The description herein mainly describes the functional steps to be accomplished by these microcontrollers, transceivers, circuits, and antennas and is not intended to describe a specific configuration of these components or specific programming.

Software and data described may be programmed into non-transitory storage memory as instructions that are accessible to and retrievable by a processor as described herein which configures and directs the processor to perform the desired functions and processes by executing the instructions in the medium.

Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise.

As illustrated in FIG. 1, an embodiment of the invention is shown generally with principal components of an audio input device 103 and a peripheral 106 for communicating with a destination computing system 108.

Figure 3:
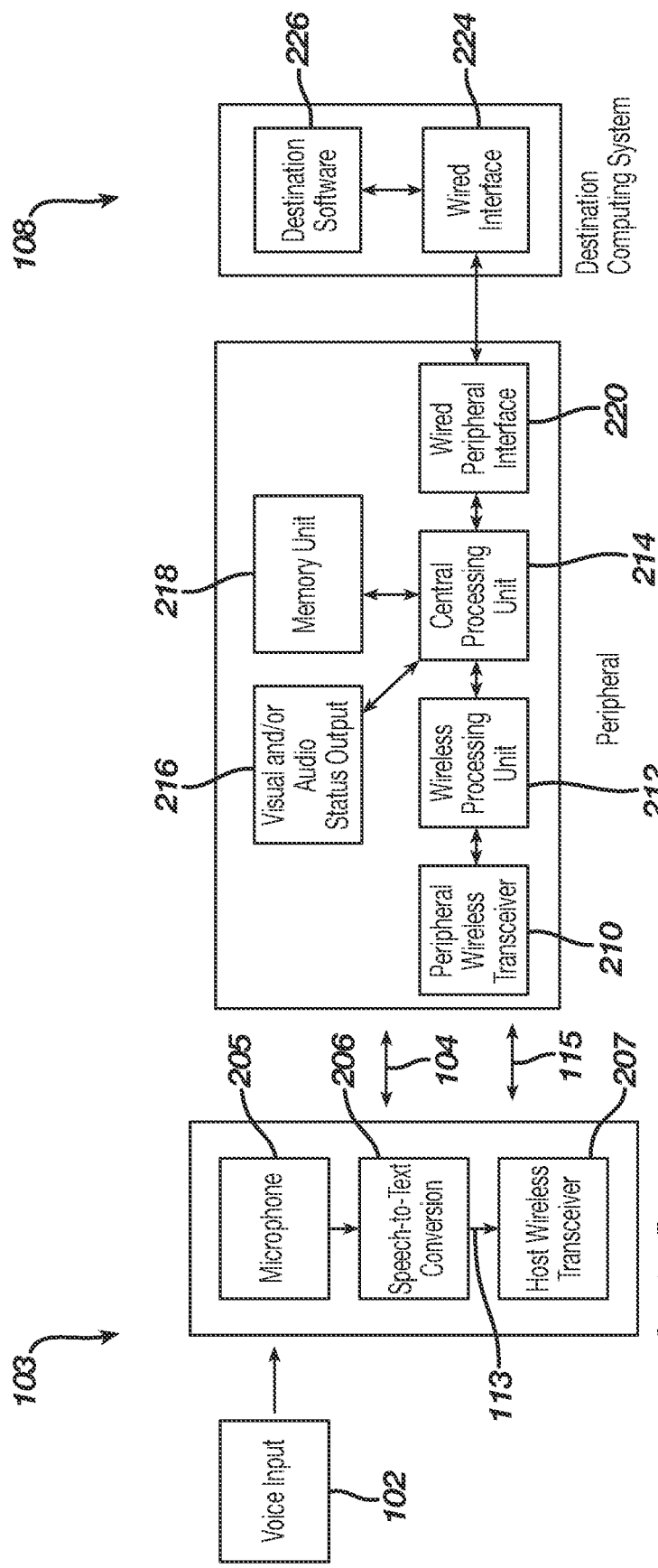
FIG. 3 is a block diagram illustrating one embodiment of the speech-to-text conversion system.

Generally, as an overview, and to be discussed in greater detail below, a user 101 in the example shown in FIGS. 1 and 3 is a health care professional who may have just completed an examination of a patient in a hospital setting. The user 101 must now enter notes regarding the patient into a destination computing system 108 for record-keeping purposes, shown in the example as a personal computer terminal as would typically be seen in the hallway of a hospital wing outside of patient's rooms. The user 101 using prior systems might manually type their notes into the destination computing system 108 or dictate their notes into a recording device for a medical data transcriber to enter into the destination computing system 108. In the first embodiment, the user 101 instead would speak the desired phrase into the audio input device 103 (shown as a smartphone in the example), through a voice input 102 signal. Third party or system speech-to-text software on the audio input device 103 will have been activated and would take the entered spoken phrase in the voice input 102 and convert the phrase into an electronic machine usable format of speech data that the user 101 had spoken. The speech-to-text software would then process the speech data and create text data in electronic machine usable format through the previously described speech-to-text process, and embed the resulting text data into a text signal 113. The text data from the text signal 113 in machine usable format would be extracted from the text signal 113, embedded into a wireless signal 104 (such as a signal described by the Bluetooth™ technology standard) for transmission to the peripheral 106, which is programmed and configured to act and appear as a generic USB keyboard to the destination computing system 108. The peripheral 106 would receive the Bluetooth™ wireless signal 104 containing the text data in electronic machine usable format, extract the text data from the wireless signal 104 and embed it into an intermediate peripheral signal 232 and using software and hardware on board would convert the words into individual keystrokes (also referred to as keystroke "scan codes" or "keyboard character codes"). The keyboard character codes would be embedded into a wired signal 208 to be inputted into the destination computing system 108 through a wired interface port 225, shown here as a USB port. The keyboard characters codes generated by the peripheral 106 will appear to be received from a generic USB keyboard as to not be prohibited by security software when interfacing with the destination computing system 108. The keyboard character codes would populate text boxes and fields on software displayed by the destination computing system 108. This process will be further explained in greater detail below.

For the purposes of disclosure and to aid in the understanding of the present invention, a movement of information or data will be described herein through a tracing of a signal, as previously defined, in its various forms through conversion stages whereby speech is translated into a format recognizable by the destination computing system 108. More particularly, as shown generally in FIGS. 1, 2, and 3, the signal will be shown in the forms of spoken audio waves as in the voice input 102, as a radio transmitted signal as in a wireless signal 104 or a wireless status signal 115, a signal passing through a device wire or circuit as in the text signal 113 or the intermediate peripheral signal 232, and as a signal between devices as in the wired signal 208.

The destination computing system 108 may be any computing system in a typical configuration consisting of a computing device 112; a display device 110, such as a monitor or screen; a keyboard 111; and a mouse 109. The keyboard 111 and the mouse 109 connect to the computing device 112 as Generic HID through a wired interface 224, such as USB input/output ports, an example of which is shown on the computing device 112 as the USB port 225. The computing device 112 typically includes multiple ports 225 built-in and situated in different locations on the computing device 112 so that multiple peripherals may be connected. The input/output ports, such as the port 225, can receive electrical signals from the keyboard 111 and the mouse 109 that are interpreted by the computing device 112 as keyboard character codes and cursor placements, respectively. The computing device, 112 via its input/output ports, such as the port 225, also supplies power to the keyboard 111 and the mouse 109 to carry out their functions, as well as other peripheral devices connected through port 225.

The destination computing system 108 in many configurations will have security software in place to prevent the introduction of malware such as viruses, worms, Trojan horses, ransomware, spyware, adware, rogue software, and scareware. This is of even greater importance in areas where data are highly confidential, such as when the destination computing system 108 is located in a hospital where highly confidential patient data are entered and stored. The destination computing system 108 software in these situations can be configured to limit interfacing and a transfer of information through each of the ports 225 to only generic HID devices, such as the keyboard 111 and the mouse 109. As such, the user 101 typically would physically type on the keyboard 111 and input cursor movements using the mouse 109, with the signal inputted into the computing device 112 through the ports 225 into text boxes or fields that would visually appear on the display device 110.

Referring to FIGS. 1 and 3, the audio input device 103 in the first embodiment is a handheld smart device, such as a smartphone or tablet, including a microphone 205, a speech-to-text conversion software 206, and a host wireless transceiver 207. While the first embodiment discloses a handheld smart device, one of ordinary skill in the art will recognize that any computing system capable of receiving audio signals as input, executing speech-to-text software, and transmitting a wireless signal may be utilized as the audio input device 103.

The user 101 initiates remote speech-to-text conversion for entry onto the destination computing system 108 through activation of the speech-to-text conversion software 206 resident in the audio input device 103, which, in the first embodiment, is a speech-to-text conversion software currently used in smart devices and well-known to one of ordinary skill in the art. After activating the speech-to-text conversion software 206 of the audio input device 103, the user 101 speaks words, phrases, punctuation, sentences, or commands, which typically are available on an HID keyboard, as a voice input 102 into the audio input device 103. The voice input 102 enters the audio input device 103 through the microphone 205 (a common device found in smart devices that causes sound waves to generate or modulate an electric current for the purpose of transmitting sound in signal form in a manner known to one of ordinary skill in the art). Within the audio input device 103, the voice input 102 is converted into a signal containing the speech data in electronic machine usable format, here shown as text signal 113. The speech-to-text conversion software 206 (which as previously described, may be present in the operating system of the audio input device 103 or may be loaded into the memory/storage of the audio input device 103 as a stand-alone application) receives the signal 113 containing the speech data and processes the speech data contained therein into an electronic machine usable format containing data representing the text of the spoken words through speech-to-text processing, which, as previously described, is a computing process well-known to one of ordinary skill in the art. The text signal 113 is processed to now contain the embedded text.

The electronic machine usable format containing data representing the text of the spoken words is extracted from text signal 113 and embedded into the wireless signal 104, which, in the first embodiment, is in the form of a Bluetooth™ signal. Bluetooth™, which may be encrypted, is a wireless technology standard designed for short-range, low-power, and multiple-channel communication and data exchange between fixed and mobile devices over short distances using short-wavelength UHF radio waves in the industrial, scientific and medical radio bands. Bluetooth™ is a well-known communication method known to anyone with ordinary skills in the art. While the first embodiment employs Bluetooth™ wireless connectivity standards for the wireless signal 104, one of ordinary skill in the art will understand that any wireless transmission type capable of being encoded or encrypted and uses a standard set of protocols and instructions for sending information wirelessly may be used.

The wireless signal 104, which is a transmittable wireless signal carrying the text data and other operational information, is wirelessly transmitted to the peripheral 106 through the host wireless transceiver 207. The host wireless transceiver 207 in the first embodiment is a transceiver well-known to one of ordinary skill in the art commonly used in smart devices and capable of sending and receiving wireless signals, such as the illustrated Bluetooth™ signal. In addition, for security, wireless signal 104 may be encrypted to prevent electronic "eavesdropping" on the content of wireless signal 104. In addition, operational and status information may be sent wirelessly back to audio input device 103 from peripheral 106 through a wireless status signal 115.

Figure 2:
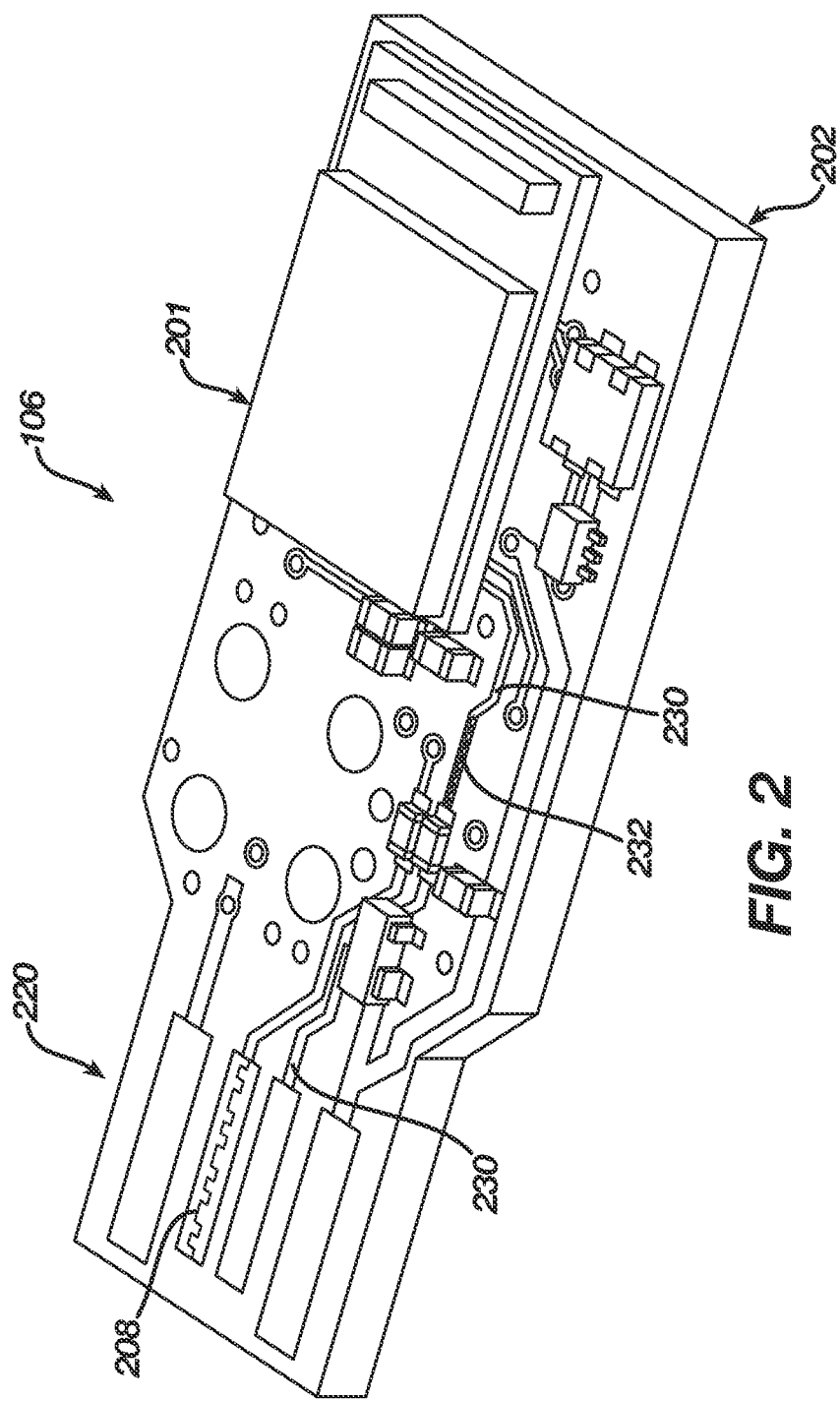
FIG. 2 is an isometric view illustrating a circuit board for the peripheral of the speech-to-text conversion system.

Referring to FIGS. 1-3, the peripheral 106 includes an electrical circuit 201 disposed on an electrical circuit board 202 enclosed in a housing 203. The peripheral 106 through the electrical circuit 201 includes a peripheral wireless transceiver 210, a wireless processing unit 212, a central processing unit 214 (hereinafter referred to as CPU 214), a status output 216, a memory unit 218, and a peripheral wired interface 220. The electrical circuit board 202 interconnects the various components for communication with each other by electronic pathways (such as circuit traces, vias, soldering points, or traces), herein shown as a pathway 230, through which the intermediate peripheral signal 232 containing the electronic machine usable format data travels. Updates to software of firmware on peripheral 106 may be made by the peripheral 106 receiving programming information through peripheral wireless transceiver 210 or peripheral wired interface 220 in a manner known to one skilled in the arts.

The peripheral wireless transceiver 210 in the first embodiment is a transceiver well-known to one of ordinary skill in the art commonly used in sending and receiving wireless signals, such as the illustrated Bluetooth™ signal. The peripheral wireless transceiver 210 receives the wireless signal 104 from the audio input device 103 and in conjunction with the wireless processing unit 212 to which it is coupled performs such tasks as decoding encryption imparted to the wireless signal 104, extracting operating commands for the peripheral wireless transceiver 210, and conversion of the text data embedded in the wireless signal 104 into the intermediate peripheral signal 232, suitable for processing by the CPU 214. The operating commands and text data are transferred to the memory unit 218 for storage and transfer to other circuitry through pathway 230. Although the CPU 214 may convert the wireless signal 104 into the intermediate peripheral signal 232, the peripheral 106 includes the wireless processing unit 212 to convert the wireless signal 104 independent of the CPU 214 such that the wireless signal 104 may be transferred from the audio input device 103 without interrupting operations of the CPU 214.

The CPU 214 performs basic arithmetic, logic, controlling, and input/output operations specified by the instructions in a program stored within the CPU 214 and the memory unit 218. The memory unit 218, which may be volatile memory, such as random access memory (RAM), or non-volatile memory, such as flash memory, or another device that employs other suitable data storage technology, is interconnected to the CPU 214 and stores, sends and receives instructional commands and processed text data in the intermediate peripheral signal 232 to and from memory unit 218.

The CPU 214 interacts with a visual and/or audio status output module 216 to visually display or audibly alert the user 101 to the system status; examples include the unit power status, the unit transmission status, transmission or connection errors, or the availability of firmware updates. This can be shown visually through such methods as light-emitting diodes (LED) by the LED blinking and/or changing color to represent unit state or status. It can also be accomplished through audio tones or beeps. The CPU 214 also may send commands back to the wireless processing unit 212 and the transceiver 210 to update status or convey information on the audio input device 103 through the wireless status signal 115.

The intermediate peripheral signal 232, after processing in CPU 214, is converted from its previous signal form of electronic machine usable format containing data representing the text of the spoken words through speech-to-text processing into a wired signal 208 embedded with electronic machine usable format data containing keyboard character codes (the specific and detailed steps to be described below). This signal is communicated from the CPU 214 to the wired interface 220 to which it is interconnected. The wired interface 220 in the present embodiment is a male USB port which physically attaches and disposes within a female USB port to enable the transfer of electronic machine usable format data in the wired signal 208 to the destination computing system 108.

The wired signal 208 is communicated from the peripheral 106 to the destination computing system 108 through the port 225, disposed within the computing device 112, a female USB port. By embedding keyboard character codes into the wired signal 208, the peripheral 106 will mimic a keyboard, such as the keyboard 111, to the destination computing system 108, which would not be locked out by security software as it would be configured to appear as a generic HID keyboard (or virtual keyboard) only capable of entering information in the form of keyboard keystrokes. Using a device such as the mouse 109, the user 101 can direct on the display device 110 of the destination computing system 108 where the text should be entered into a destination software 226, which could be any software where text can be entered into fields or text boxes.

Figure 4:
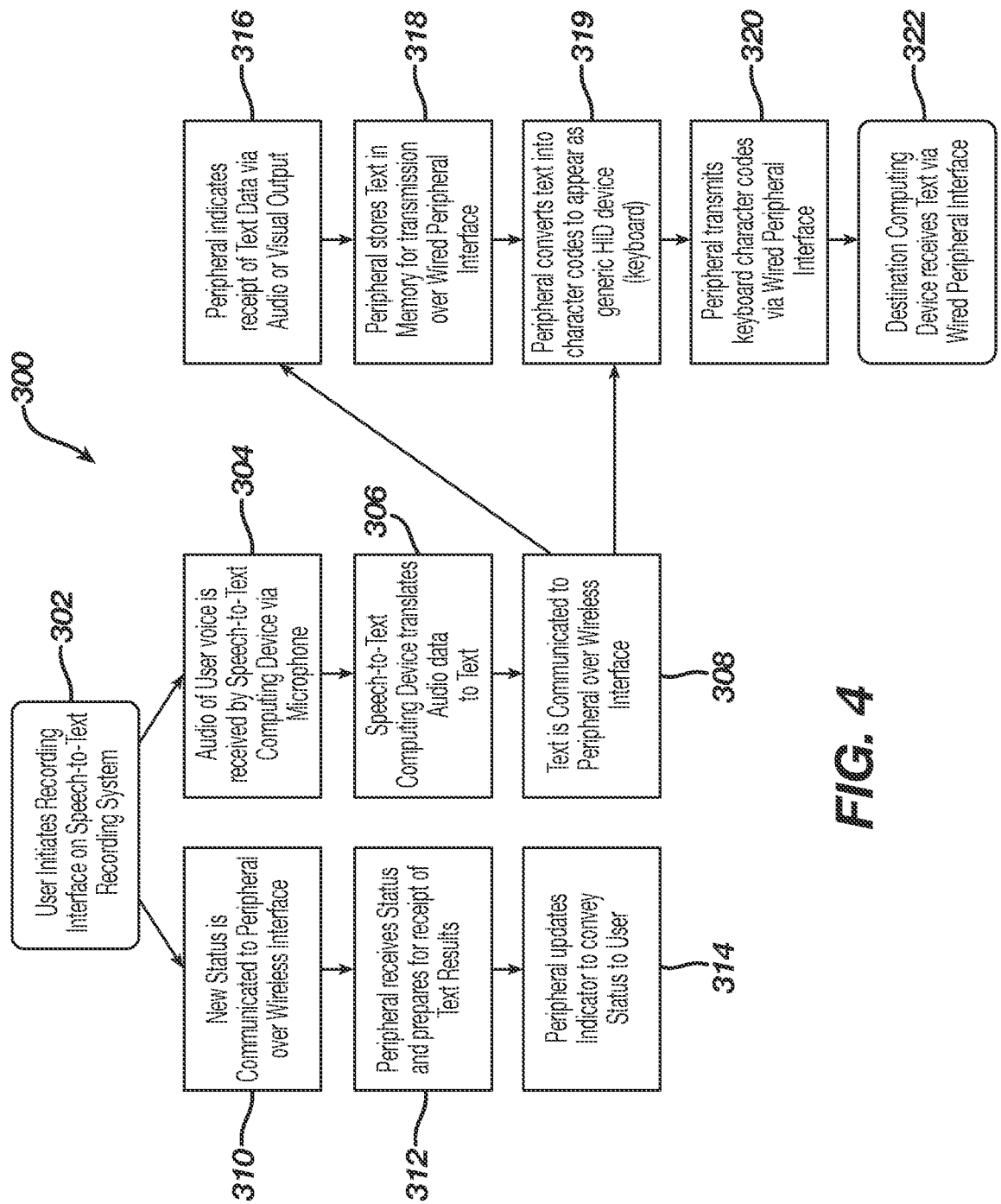
FIG. 4 is a flow diagram illustrating operation of the speech-to-text conversion system in remote speech-to-text conversion for entry into a destination computing system.

FIG. 4 illustrates a flow chart for the detailed processes of the method and device, as performed by the audio input device 103 and the peripheral 106 in their communication with the destination computing system 108 as shown in FIG. 1. The method 300 begins at a block 302 where the user 101 initiates a recording interface on a speech-to-text recording system on the audio input device 103, which in one embodiment would be on a smartphone, where the user would open the speech-to-text software 206 on the audio input device 103, authenticate the application, and initiate recording. With the software 206 active, a block 304 shows the step of the voice sample being received through the microphone 205 on the audio input device 103 and communicated to the speech-to-text software 206 through the voice input 102 signal, where, in a block 306, it is processed from the spoken word into the text signal 113, which is an electronic machine usable format containing the text. A block 308 displays the functional step of the audio input device 103 converting the electronic machine usable format containing the text from the audio input device 103 to the peripheral 106 by way of a wireless signal such as Bluetooth™, wherein electronic machine usable format data containing the text is embedded into the Bluetooth™ signal. Simultaneous to the steps in the blocks 304, 306, and 308 occurring, the audio input device 103 and the peripheral 106 would exchange information as shown in the blocks 310, 312 and 314. As shown in a block 310, the present status state is communicated to the peripheral 106 by the wireless signal 104 as determined by the software 206 on the audio input device 103. Such status changes could include whether the audio input device 103 is in standby mode or initiating a data transfer. A block 312 shows the functional step of the peripheral 106 receiving a status change such as the impending transfer of speech-to-text data and preparation to receive these data. A block 314 shows the peripheral 106 updating the status change to the user, which is shown in a block 316 as visually or audibly indicating the status change of having received the text data to the user, in different embodiments this could be by an LED light located on the board 107 of the peripheral 106 as described earlier.

Figure 6:
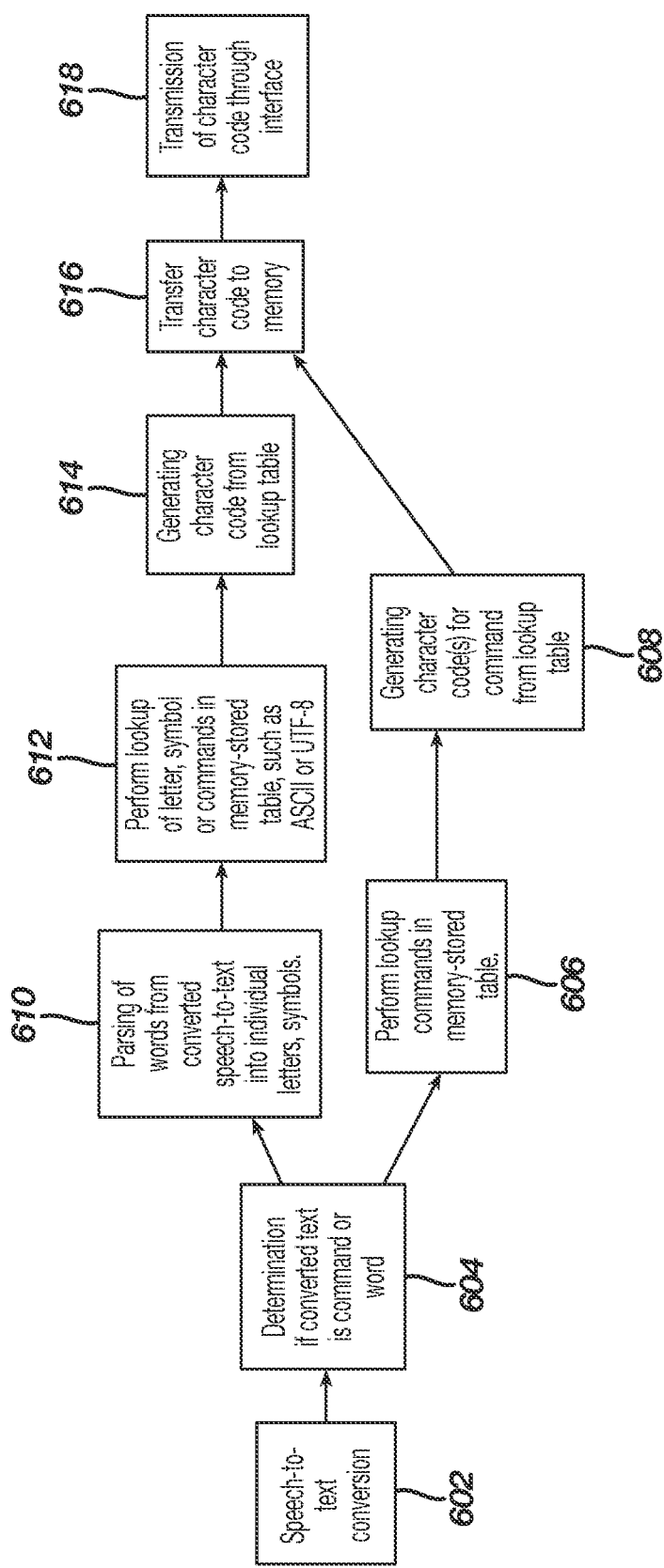
FIG. 6 is a flow diagram illustrating operation of the speech-to-text conversion system in converting text and commands to keyboard character codes for entry into a destination computing system.

The process of the peripheral 106 receiving the wireless signal 104, extracting the electronic machine usable format containing the text and processing it into the intermediate peripheral signal 232 is shown in the blocks 318 and 319. The block 318 shows the storage of the electronic machine usable format into memory 218. The block 319 represents the processing of the electronic machine usable format in the CPU 214 into its next format, which will be described below. While the blocks 318 and 319 are shown in sequence, either could take place initially before the other and the communication by way of intermediate peripheral signal 232 between the memory 218 and the CPU 214 through pathway 230 could occur several times in both directions in the same operation. The block 319 shows the general step of parsing the text words contained in the electronic machine usable format of the intermediate peripheral signal 232 into individual letters, and in turn, into individual or multiple keyboard character codes for processes such as editing or formatting. This process will be explained in greater detail below with reference to FIGS. 6 and 7 are described.

The block 320 represents the process of the intermediate peripheral signal 232 embedded with electronic machine usable format data containing text being converted from an intermediate peripheral signal into a wired signal 208, with the CPU 214 on the peripheral 106 transmitting the electronic machine usable format data containing the individual keyboard character codes to the destination computing system 108 through the wired interface 220 by wired signal 208. In one embodiment, wired interface 220 would be a USB-A plug on peripheral 106 to a USB-A port on the destination computing system 108. The block 320 also represents the functional step of the destination computing device 108 receiving the wired signal 208 containing electronic machine usable format data embedded with the individual keyboard character codes through the USB-A interface as keyboard character codes to be entered into the destination computing system 108.

FIGS. 1, 4, 5, 6, and 7 show the detailed steps and lookup tables of the block 319 to convert the user's 101 spoken voice input 102 entered though the microphone 205 on the audio input device 103 and the peripheral 106 to the instructions 406.

Figure 5:
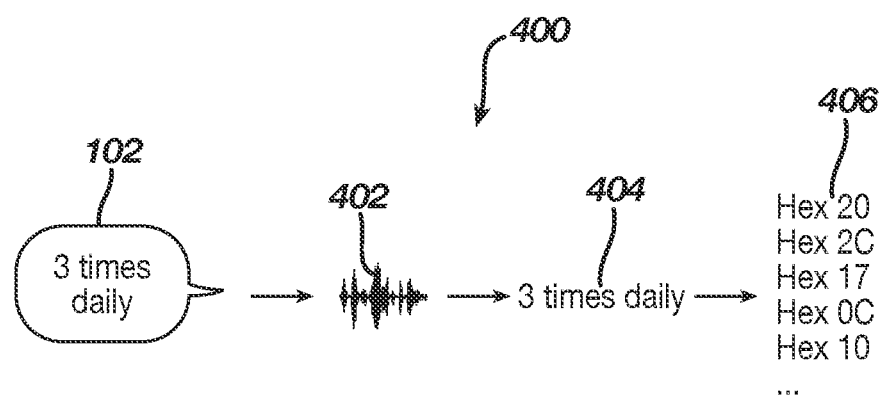
FIG. 5 is a flow diagram illustrating an example remote speech-to-text conversion and character/command generation.

In FIG. 5, a general overview of speech-to-text conversion and subsequent conversion to keyboard character codes or commands 400 is shown in overview where the voice input 102 is converted to the signal 402, which is converted to either commands or individual text words 404 and further processed into keyboard character codes or command instructions 406. The entirety of the process 400 in one embodiment could take place within the audio input device 103 with the peripheral 106 only receiving the wireless signal 104 containing the electronic machine usable format data containing the individual keyboard character codes and communicating the signal to the destination computing system 108 through the wired interface 220. In the displayed embodiment, the generation of the voice input 102, the signal 401, and the commands/words 404 would take place on the audio input device 103, with the instructions 406 taking place on peripheral 106.

In FIGS. 1, 6, and 7, the block 602 represents the speech-to-text conversion, where the voice input 102 is converted to individual words through the software of the audio input device 103, a computing process which as stated earlier is widely used in various embodiments of the audio input device 103 and other applications and is known to anyone skilled in the arts. In the block 604, an initial determination is made in the software 206 on the audio input device 103 as to whether the word or set of words converted correspond to a defined user command stored in a table located in memory. In the displayed embodiment, the block 602 would take place in software located on the audio input device 103 and the block 604 and subsequent functions defined in blocks of FIG. 6 would occur on the peripheral 106. In other embodiments, these functions could take place on either the audio input device 103 or the peripheral 106.

If the word or set of words does not correspond to a defined user command stored in a table located in memory, the block 610 represents the function of parsing the word into its individual letters by the software located in the memory 218 through its communication with CPU 214 through pathway 230 by intermediate peripheral signal 232 on the board 202 of the peripheral 106. In the block 612, the individual letter is analyzed by the CPU 214 and compared to a lookup table 500 stored in the memory 218 of the peripheral 106, an example of which is shown in FIG. 7. From this table 500, a keyboard character code is generated based on the keyboard character code associated with that letter in the table. For the phrase shown as an example of voice input 102 "3 times daily," the software would take the first character "3" and perform a lookup in table 500. The entry 502 for "3" would correspond to Hex usage ID "20" in the keystroke 504. The software would then take the second character "spacebar" and perform a lookup in the table 500. The entry 506 for "spacebar" would correspond to Hex usage ID "2C" in the keystroke 508. For the third character of "t," the entry 510 would correspond to Hex usage ID "17" in the keystroke 512. The software would then take each remaining character in "imes daily" and perform a lookup in the table 500 to generate a corresponding Hex usage ID. The keystrokes 504, 508, and 512 represented by the Usage ID codes of "20-2C-17" as well as the usage ID codes corresponding to "imes daily" would be generated by the CPU 214 as shown in a block 614 and stored in the memory 218 of the peripheral 106 as shown in a block 616, until ready to be transmitted in a block 618 to the destination computing system 108, and would appear as keyboard character codes generated by a generic HID for purposes of entering text into the destination computing system 108 without invoking security lockouts as it would appear to be an ordinary keyboard. These keyboard character codes would then populate text boxes or fields on the destination computing system 108.

Referring back to block 604, if the word or set of words does correspond to a defined user command stored in a table located in memory, the block 606 shows the lookup of the command in a stored table within memory 218 by CPU 214. Because commands may require multiple keystrokes, multiple keyboard character codes in the block 608 would be generated by CPU 214. For example, if the command "select all" for a PC were invoked, the keyboard character codes for the character keys "Control" and "A" would need to be generated together in the same way as the individual letters of a word were as previously described. These keyboard character codes would be generated as shown in the block 608 by the CPU 214, stored in the memory of the peripheral 106 in the block 616 until the CPU 214 was ready to transmit as shown the block 618 to the destination computing system 108.

While the first embodiment of the speech-to-text conversion system 100 operates in accordance with the speech-to-text conversion software 206 resident in the audio input device 103, one of ordinary skill in the art will recognize that the speech-to-text conversion system 100 in a second embodiment may be configured whereby speech-to-text conversion software is resident in the peripheral 106. More particularly, speech-to-text conversion software, which, in the second embodiment, is a speech-to-text conversion software well-known to one of ordinary skill in the art, is installed in the memory unit 218 of the peripheral 106 such that the CPU 214 of the peripheral 106 or the wireless processing unit 212 performs speech-to-text conversion of the voice input 102 signal received from the audio input device 103, which has been transmitted wirelessly using known wireless technology and transmission techniques, such as Bluetooth™. In the second embodiment, the audio input device 103, accordingly, is any device, such as a microphone, headphone set, earbuds, or tablet, capable of receiving speech as the voice input 102, causing sound waves to generate or modulate an electric current for the purpose of transmitting sound in signal form in a manner known to one of ordinary skill in the art, and wirelessly transmitting the sound in signal form.

In a second embodiment, in FIGS. 1, 3 and 4, the blocks 302, 304, and 308 would take place within the audio input device 103 in the same way as shown and described in the first embodiment, except without the software 206 performing the speech-to-text conversion in the block 306, the wirelessly transmitted signal would be speech converted to signal form. The block 306 function of speech-to-text conversion would take place through additional programming within CPU 214 or the wireless processing unit 212.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. A computer-peripheral device configured to present as an HID keyboard to a destination computing system, comprising:
   a transceiver configured to receive a wireless signal embedded with text data developed from a voice input;
   a non-transitory memory storage including instructions stored therein;
   one or more hardware processors in communication with the non-transitory memory storage and the transceiver, the one or more hardware processors being configured to execute the instructions stored in the non-transitory memory storage, wherein the one or more hardware processors:
      extract the text data from the wireless signal,
      embed the text data in an internal peripheral signal,
      store the text data embedded within the internal peripheral signal in the non-transitory memory storage,
      determine a keyboard character code for each character in the text data to develop keyboard character codes corresponding with the text data,
      store the keyboard character codes in the non-transitory memory storage, and
      generate a wired signal embedded with the keyboard character codes; and
   an interface port in communication with the one or more hardware processors, the interface port being adapted to interface with the destination computing system, whereby the computer-peripheral device communicates with the destination computing system through the interface port such that, following connection to the destination computing system, the one or more hardware processors transmit to the destination computing system through the interface port the keyboard character codes embedded within the wired signal.

2. The computer-peripheral device of claim 1, the non-transitory memory storage including a lookup table stored therein, comprising each keyboard character code associated with each individual character available on an HID keyboard.

3. The computer-peripheral device of claim 2, wherein, when determining a keyboard character code for each character in the text data, the one or more hardware processors:
   parse the text data into each individual character comprising the text data;
   compare each individual character in the text data with each keyboard character code in the lookup table until the keyboard character code associated with the individual character in the text data is determined, thereby developing keyboard character codes corresponding with the text data;
   store the keyboard character codes in the non-transitory memory storage; and
   generate the wired signal embedded with the keyboard character codes.

4. The computer-peripheral device of claim 2, wherein the one or more hardware processors:
   determine whether the text data correspond to characters or a defined user command;
   determine a keyboard character code for each character in the text data to develop keyboard character codes corresponding with the text data when the text data correspond to characters; and
   determine each keyboard character code required by the defined user command in the text data to develop keyboard character codes corresponding with the defined user command when the text data correspond to a defined user command.

5. The computer-peripheral device of claim 4, wherein, when determining each keyboard character code required by the defined user command, the one or more hardware processors:

compare the defined user command in the text data with each keyboard character code in the lookup table until keyboard character codes associated with the defined user command in the text data are determined, thereby developing the keyboard character codes corresponding with the text data;

store the keyboard character codes in the non-transitory memory storage; and generate the wired signal embedded with the keyboard character codes.

6. The computer-peripheral device of claim 1, the one or more hardware processors, comprising:

a CPU configured to execute the instructions stored in the non-transitory memory storage, whereby the CPU:
 determines the keyboard character code for each text character in the text data to develop keyboard character codes corresponding with the text data,
 stores the keyboard character codes in the non-transitory memory storage,
 generates a wired signal embedded with the keyboard character codes, and
 transmits to the destination computing system through the interface port the keyboard character codes embedded within the wired signal; and a wireless processing unit configured to execute the instructions stored in the non-transitory memory storage, whereby the wireless processing unit:
 extracts the text data from the wireless signal,
 embeds the text data in an internal peripheral signal, and
 stores the text data embedded within the internal peripheral signal in the non-transitory memory storage independent of the CPU.

7. The computer-peripheral device of claim 1, the transceiver being configured to receive the wireless signal embedded with the text data from an audio input device configured to receive a voice input, perform speech-to-text processing on the voice input thereby producing text data representing the voice input, embed the text data in the wireless signal, and transmit the wireless signal embedded with the text data representing the voice input.

8. A speech-to-text conversion system, comprising:

an audio input device configured to receive a voice input, perform speech-to-text processing on the voice input thereby producing text data representing the voice input, embed the text data in a wireless signal, and transmit the wireless signal embedded with the text data representing the voice input; and a computer-peripheral device configured to present as an HID keyboard to a destination computing system, comprising:
 a transceiver configured to receive the wireless signal embedded with the text data developed from the voice input;
 a non-transitory memory storage including instructions stored therein;
 one or more hardware processors in communication with the non-transitory memory storage and the transceiver, the one or more hardware processors being configured to execute the instructions stored in the non-transitory memory storage, wherein the one or more hardware processors:
  extract the text data from the wireless signal,
  embed the text data in an internal peripheral signal,
  store the text data embedded within the internal peripheral signal in the non-transitory memory storage,
  determine a keyboard character code for each character in the text data to develop keyboard character codes corresponding with the text data,
  store the keyboard character codes in the non-transitory memory storage, and
  generate a wired signal embedded with the keyboard character codes; and
 an interface port in communication with the one or more hardware processors, the interface port being adapted to interface with the destination computing system, whereby the computer-peripheral device communicates with the destination computing system through the interface port such that, following connection to the destination computing system, the one or more hardware processors transmit to the destination computing system through the interface port the keyboard character codes embedded within the wired signal.

9. The speech-to-text conversion system of claim 8, the non-transitory memory storage including a lookup table stored therein, comprising each keyboard character code associated with each individual character available on an HID keyboard.

10. The speech-to-text conversion system of claim 9, wherein, when determining a keyboard character code for each character in the text data, the one or more hardware processors:
 parse the text data into each individual character comprising the text data;
 compare each individual character in the text data with each keyboard character code in the lookup table until the keyboard character code associated with the individual character in the text data is determined, thereby developing keyboard character codes corresponding with the text data;
 store the keyboard character codes in the non-transitory memory storage; and
 generate the wired signal embedded with the keyboard character codes.

11. The speech-to-text conversion system of claim 9, wherein the one or more hardware processors:
 determine whether the text data correspond to characters or a defined user command;
 determine a keyboard character code for each character in the text data to develop keyboard character codes corresponding with the text data when the text data correspond to characters; and
 determine each keyboard character code required by the defined user command in the text data to develop keyboard character codes corresponding with the defined user command when the text data correspond to a defined user command.

12. The speech-to-text conversion system of claim 11, wherein, when determining each keyboard character code required by the defined user command, the one or more hardware processors:
 compare the defined user command in the text data with each keyboard character code in the lookup table until keyboard character codes associated with the defined user command in the text data are determined, thereby developing the keyboard character codes corresponding with the text data;
 store the keyboard character codes in the non-transitory memory storage; and
 generate the wired signal embedded with the keyboard character codes.

13. The speech-to-text conversion system of claim 8, the one or more hardware processors, comprising:
- a CPU configured to execute the instructions stored in the non-transitory memory storage, whereby the CPU:
  - determines the keyboard character code for each text character in the text data to develop keyboard character codes corresponding with the text data,
  - stores the keyboard character codes in the non-transitory memory storage,
  - generates a wired signal embedded with the keyboard character codes, and
  - transmits to the destination computing system through the interface port the keyboard character codes embedded within the wired signal; and
- a wireless processing unit configured to execute the instructions stored in the non-transitory memory storage, whereby the wireless processing unit:
  - extracts the text data from the wireless signal,
  - embeds the text data in an internal peripheral signal, and
  - stores the text data embedded within the internal peripheral signal in the non-transitory memory storage independent of the CPU.

14. A speech-to-text conversion system, comprising:
- an audio input device configured to receive a voice input, embed the voice input in a wireless signal, and transmit the wireless signal embedded with the voice input; and
- a computer-peripheral device configured to present as an HID keyboard to a destination computing system, comprising:
  - a transceiver configured to receive the wireless signal embedded with the voice input from the audio input device;
  - a non-transitory memory storage including instructions stored therein including instructions for speech-to-text conversion;
  - one or more hardware processors in communication with the non-transitory memory storage and the transceiver, the one or more hardware processors being configured to execute the instructions stored in the non-transitory memory storage, wherein the one or more hardware processors:
    - extract the voice input from the wireless signal,
    - convert the voice input into text data representing the voice input,
    - embed the text data in an internal peripheral signal,
    - store the text data embedded within the internal peripheral signal in the non-transitory memory storage,
    - determine a keyboard character code for each character in the text data to develop keyboard character codes corresponding with the text data,
    - store the keyboard character codes in the non-transitory memory storage, and
    - generate a wired signal embedded with the keyboard character codes; and
  - an interface port in communication with the one or more hardware processors, the interface port being adapted to interface with the destination computing system, whereby the computer-peripheral device communicates with the destination computing system through the interface port such that, following connection to the destination computing system, the one or more hardware processors transmit to the destination computing system through the interface port the keyboard character codes embedded within the wired signal.

15. The speech-to-text conversion system of claim 14, the non-transitory memory storage including a lookup table stored therein, comprising each keyboard character code associated with each individual character available on an HID keyboard.

16. The speech-to-text conversion system of claim 15, wherein, when determining a keyboard character code for each character in the text data, the one or more hardware processors:
- parse the text data into each individual character comprising the text data;
- compare each individual character in the text data with each keyboard character code in the lookup table until the keyboard character code associated with the individual character in the text data is determined, thereby developing keyboard character codes corresponding with the text data;
- store the keyboard character codes in the non-transitory memory storage; and
- generate the wired signal embedded with the keyboard character codes.

17. The speech-to-text conversion system of claim 15, wherein the one or more hardware processors:
- determine whether the text data correspond to characters or a defined user command;
- determine a keyboard character code for each character in the text data to develop keyboard character codes corresponding with the text data when the text data correspond to characters; and
- determine each keyboard character code required by the defined user command in the text data to develop keyboard character codes corresponding with the defined user command when the text data correspond to a defined user command.

18. The speech-to-text conversion system of claim 17, wherein, when determining each keyboard character code required by the defined user command, the one or more hardware processors:
- compare the defined user command in the text data with each keyboard character code in the lookup table until keyboard character codes associated with the defined user command in the text data are determined, thereby developing the keyboard character codes corresponding with the text data;
- store the keyboard character codes in the non-transitory memory storage; and
- generate the wired signal embedded with the keyboard character codes.

19. The speech-to-text conversion system of claim 14, the one or more hardware processors, comprising:
- a CPU configured to execute the instructions stored in the non-transitory memory storage, whereby the CPU:
  - converts the voice input into text data representing the voice input,
  - embeds the text data in an internal peripheral signal,
  - stores the text data embedded within the internal peripheral signal in the non-transitory memory storage,
  - determines the keyboard character code for each text character in the text data to develop keyboard character codes corresponding with the text data,
  - stores the keyboard character codes in the non-transitory memory storage,
  - generates a wired signal embedded with the keyboard character codes, and transmits to the destination computing system through the interface port the keyboard character codes embedded within the wired signal; and
a wireless processing unit configured to execute the instructions stored in the non-transitory memory storage, whereby the wireless processing unit:
extracts the voice input from the wireless signal, and
stores the voice input in the non-transitory memory storage independent of the CPU.

20. The speech-to-text conversion system of claim 14, the one or more hardware processors, comprising:
a CPU configured to execute the instructions stored in the non-transitory memory storage, whereby the CPU:
determines the keyboard character code for each text character in the text data to develop keyboard character codes corresponding with the text data,
stores the keyboard character codes in the non-transitory memory storage,
generates a wired signal embedded with the keyboard character codes, and
transmits to the destination computing system through the interface port the keyboard character codes embedded within the wired signal; and
a wireless processing unit configured to execute the instructions stored in the non-transitory memory storage, whereby the wireless processing unit:
extracts the voice input from the wireless signal,
stores the voice input in the non-transitory memory storage independent of the CPU,
converts the voice input into text data representing the voice input,
embeds the text data in an internal peripheral signal, and
stores the text data embedded within the internal peripheral signal in the non-transitory memory storage independent of the CPU.

21. A method of presenting a computer-peripheral device to a destination computing system as an HID keyboard, comprising:
coupling an interface port of the computer-peripheral device with a wired interface port of the destination computing system;
receiving a wireless signal embedded with text data developed from a voice input;
extracting the text data from the wireless signal;
embedding the text data in an internal peripheral signal;
storing the text data embedded within the internal peripheral signal in a non-transitory memory storage,
determining a keyboard character code for each character in the text data to develop keyboard character codes corresponding with the text data;
storing the keyboard character codes in the non-transitory memory storage;
generating a wired signal embedded with the keyboard character codes; and
transmitting the keyboard character codes embedded within the wired signal from the computer-peripheral device to the destination computing system via the interface port of the computer-peripheral device and the wired interface port of the destination computing system.

22. The method of claim 21, comprising storing in the non-transitory memory storage a lookup table, comprising each keyboard character code associated with each individual character available on an HID keyboard.

23. The method of claim 22, comprising:
parsing the text data into each individual character comprising the text data;
comparing each individual character in the text data with each keyboard character code in the lookup table until the keyboard character code associated with the individual character in the text data is determined, thereby developing keyboard character codes corresponding with the text data;
storing the keyboard character codes in the non-transitory memory storage; and
generating the wired signal embedded with the keyboard character codes.

24. The method of claim 22, comprising:
determining whether the text data correspond to characters or a defined user command;
determining a keyboard character code for each character in the text data to develop keyboard character codes corresponding with the text data when the text data correspond to characters; and
determining each keyboard character code required by the defined user command in the text data to develop keyboard character codes corresponding with the defined user command when the text data correspond to a defined user command.

25. The method of claim 24, comprising:
comparing the defined user command in the text data with each keyboard character code in the lookup table until keyboard character codes associated with the defined user command in the text data are determined, thereby developing the keyboard character codes corresponding with the text data;
storing the keyboard character codes in the non-transitory memory storage; and
generating the wired signal embedded with the keyboard character codes.

26. A method of presenting a computer-peripheral device to a destination computing system as an HID keyboard, comprising:
coupling an interface port of the computer-peripheral device with a wired interface port of the destination computing system;
receiving a wireless signal embedded with a voice input;
extracting the voice input from the wireless signal;
converting the voice input into text data representing the voice input;
embedding the text data in an internal peripheral signal;
storing the text data embedded within the internal peripheral signal in a non-transitory memory storage,
determining a keyboard character code for each character in the text data to develop keyboard character codes corresponding with the text data;
storing the keyboard character codes in the non-transitory memory storage;
generating a wired signal embedded with the keyboard character codes; and
transmitting the keyboard character codes embedded within the wired signal from the computer-peripheral device to the destination computing system via the interface port of the computer-peripheral device and the wired interface port of the destination computing system.

27. The method of claim 26, comprising storing in the non-transitory memory storage a lookup table, comprising each keyboard character code associated with each individual character available on an HID keyboard.

28. The method of claim 27, comprising:
parsing the text data into each individual character comprising the text data;
comparing each individual character in the text data with each keyboard character code in the lookup table until the keyboard character code associated with the individual character in the text data is determined, thereby developing keyboard character codes corresponding with the text data;
storing the keyboard character codes in the non-transitory memory storage; and
generating the wired signal embedded with the keyboard character codes.

29. The method of claim 27, comprising:
determining whether the text data correspond to characters or a defined user command;
determining a keyboard character code for each character in the text data to develop keyboard character codes corresponding with the text data when the text data correspond to characters; and
determining each keyboard character code required by the defined user command in the text data to develop keyboard character codes corresponding with the defined user command when the text data correspond to a defined user command.

30. The method of claim 29, comprising:
comparing the defined user command in the text data with each keyboard character code in the lookup table until keyboard character codes associated with the defined user command in the text data are determined, thereby developing the keyboard character codes corresponding with the text data;
storing the keyboard character codes in the non-transitory memory storage; and
generating the wired signal embedded with the keyboard character codes.

\* \* \* \* \*